April 16, 1957 P. MARTIN 2,788,643
VERTICAL FROZEN MILK MACHINE
Filed July 26, 1954 2 Sheets-Sheet 1

INVENTOR
PHILIP MARTIN,
BY Hall & Houghton
ATTORNEY

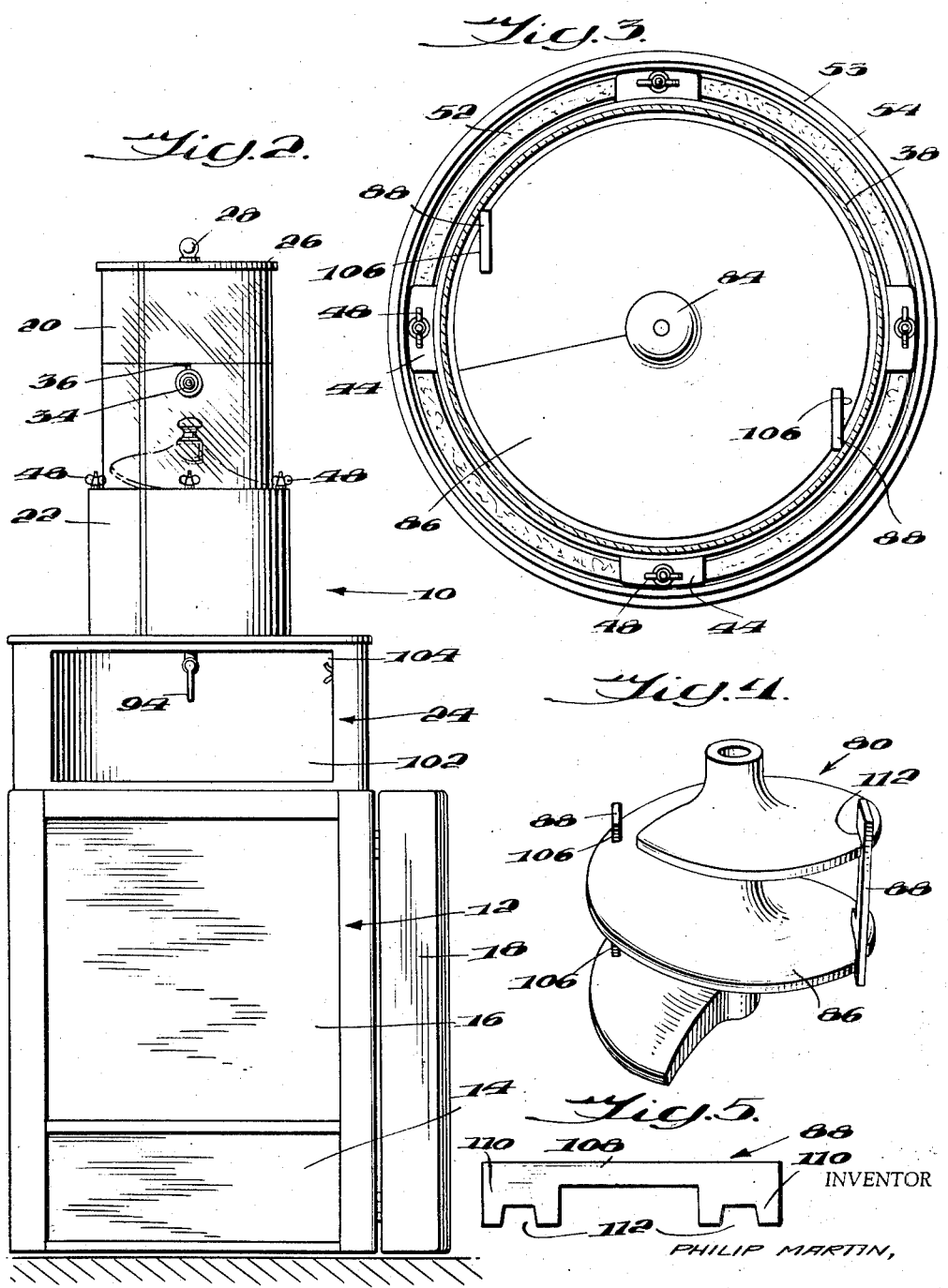

United States Patent Office 2,788,643
Patented Apr. 16, 1957

2,788,643

VERTICAL FROZEN MILK MACHINE

Philip Martin, North Hollywood, Calif., assignor to Marcus Lipsky, Los Angeles, Calif.

Application July 26, 1954, Serial No. 445,815

7 Claims. (Cl. 62—114)

This invention relates to a machine for making frozen milk or the like, and more particularly to a vertical type of machine for making and dispensing a frozen product in a soft semi-solid form, such as frozen custard.

While machines for making ice cream, frozen custard, or similar products have long been known in the art, it is a primary object of the present invention to provide a machine that is extremely simple, which eliminates all unnecessary controls, pumps, and other complicated mechanisms, which is more economical to manufacture and maintain, and which dispenses its product faster.

Another object of the invention is to provide a machine for producing a frozen product in which the storing, freezing, and dispensing operations are combined in a single compact unit.

An additional object of the invention is to provide a frozen milk machine which may be utilized in conjunction with a conventional refrigerator.

A further object of the invention is to provide a unique machine of the vertical gravity feed type.

These and other objects of the invention will become more apparent in the following detailed description of the invention when taken in conjunction with the accompanying drawings wherein:

Figure 2 is a front elevation view of the exterior form of the invention, including a conventional refrigerator;

Figure 3 is a sectional view taken along line 3—3 in Figure 1;

Figure 4 is a perspective view of an auger and associated parts employed in the freezing and dispensing of the frozen product; and Figure 5 is a detail of a scraper or wiper employed in conjunction with the auger of Figure 4.

Figure 1:
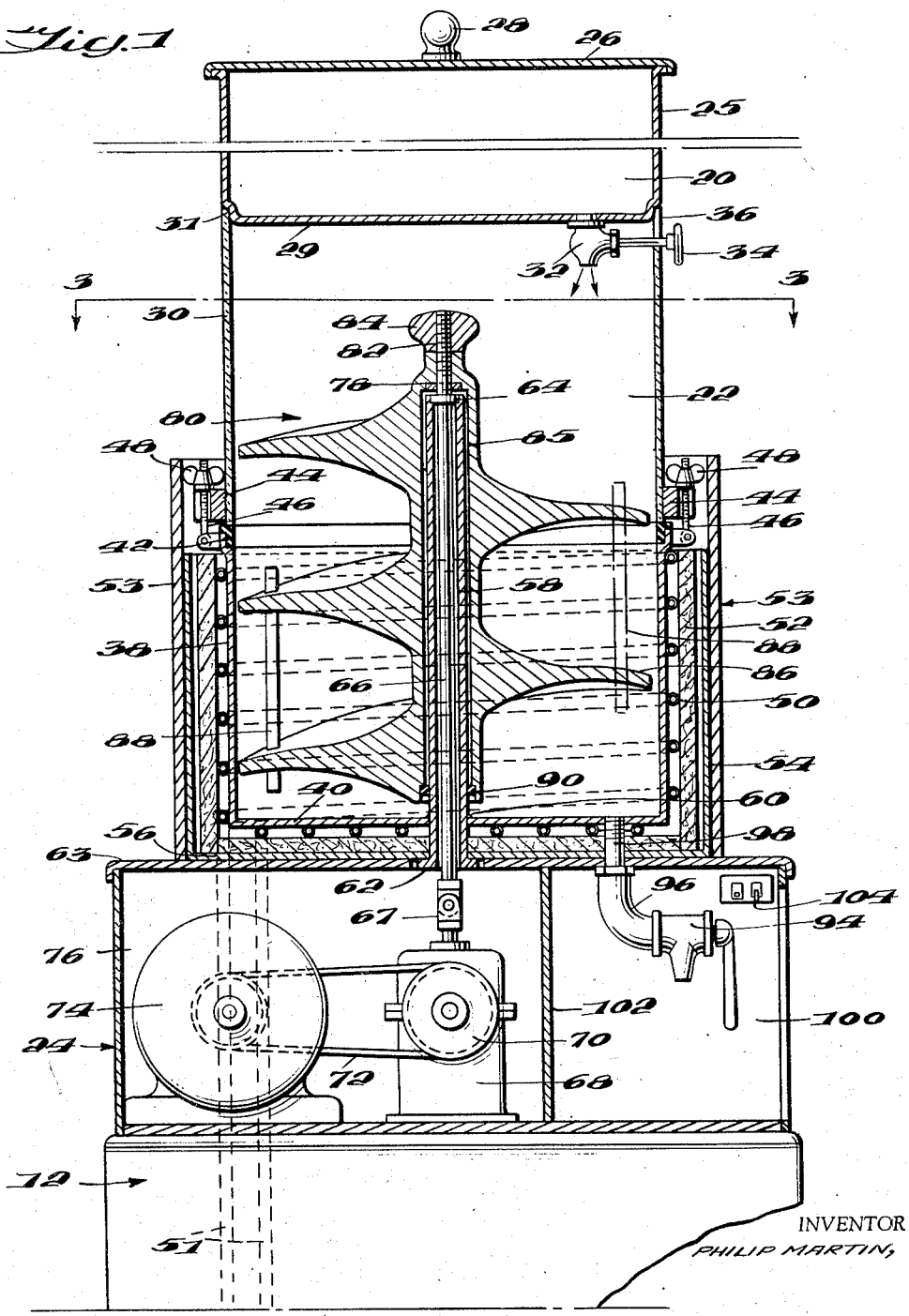
Figure 1 is an enlarged partly sectional view of the invention, illustrating the relationship of the working parts.

Briefly, the objects of the invention are accomplished by providing a freezer chamber surrounded by cooling coils which may be connected to the conventional refrigeration apparatus of a standard refrigerator, which also may serve as a support for the frozen product machine. The liquid mix which serves as the raw material for the frozen product may be stored in the refrigerator and transferred to a liquid reservoir above the freezer chamber. The liquid mix may be passed from the reservoir to the freezer chamber as required. An agitator in the freezer chamber, which may be driven from a source of power below the chamber, assures the uniform freezing of the mix and aids in the dispensing of the final product through a suitable outlet.

Referring now to Figure 2 of the drawings, a frozen product machine generally designated by reference numeral 10 is supported on a conventional refrigerator generally designated by reference numeral 12. The refrigerator may include a compartment 14 housing the compressor, condenser and associated apparatus, a storage compartment 16, and a door 18. The machine includes a reservoir 20 for holding the liquid mix or the like, a freezer chamber 22, and a base 24, which, as will appear more fully hereinafter, may include a dispensing compartment and a motor compartment.

Referring to Figure 1, reservoir 20 may include a cylindrical wall 25, a circular cover 26 having a suitable handle 28, and a circular bottom wall 29. The reservoir is supported on an upper cylindrical wall 30 of freezer chamber 22 and may be provided with a bottom section 31 of reduced diameter, which fits within the freezer chamber. This section maintains alignment of the reservoir and freezer chamber, but if desired the reservoir can be removed by simply lifting it from its support. A suitable outlet, such as the faucet 32 aligned with an orifice in bottom wall 29 may be provided to allow release of the contents of reservoir 20 into the freezing chamber 22. The faucet may be controlled by a handle 34 on a shaft which passes through a slot 36 in wall 30 so that the faucet is controllable from the outside of the machine. The liquid mix passes to the freezer chamber under the influence of gravity.

The freezer chamber may be formed in two portions, upper cylindrical portion 30 and a lower cylindrical portion 38. The upper portion may be formed of a transparent material such as "Plexiglas." The lower portion may be formed of stainless steel, for example, and may be provided with a bottom wall 40 so that walls 29, 30, 38 and 40 form a closed freezer chamber. Cylindrical wall 38 may be provided at its upper extremity with a circular gasket 42, which serves to support cylindrical wall 30. Gasket 42 may be formed of rubber or other flexible material and may fit over the edge of wall 38. Wall 38 may also be provided at its upper extremity with a plurality of swing bolts 46 (see Figures 1-3) which cooperate with a corresponding plurality of vertically slotted flanges 44, suitably attached to cylindrical wall 30, and with a corresponding plurality of wing nuts 48. The bolts swing into the slotted flanges, and the pressure exerted by the wing nuts threaded onto the bolts draws wall 30 down onto gasket 42. The swing bolts, flanges, and wing nuts are well known in the art, and may be replaced by any other suitable means of attachment.

Cooling coils 50 surround the lower portion of the freezer chamber and may be connected by pipes 51 to a source of refrigerant, such as the refrigeration system of refrigerator 12. The cooling coils surround the side and bottom wall of the lower portion of the freezer chamber and are in turn surrounded by a wall of insulation 52. The lower portion of the freezer chamber may be enclosed within an outer chamber comprising cylindrical side wall 54 and circular bottom wall 56, formed of stainless steel, for example. A decorative and protective shield 53 may also be provided in the form of a cylindrical outer wall.

The freezer chamber is provided with a central sleeve 58, which may be welded as at 60 and 62 to the bottom wall 40 of the freezer chamber and to the cover 63 of base 24, respectively. The junction of sleeve 58 with bottom wall 40 of the freezer compartment is, of course, liquidtight. The sleeve is provided at its upper extremity with ball bearings 64, which rotatably support a drive shaft 66. The lower extremity of the drive shaft is connected, as by a universal joint 67, to a gear reduction unit 68. The gear reduction unit is provided with a pulley 70 which receives a belt 72 connected to a corresponding pulley on the drive shaft of a motor 74. The motor and gear reduction unit may be supported in a motor chamber 76 formed in base 24. The upper extremity of drive shaft 66 is provided with a key 78 which is received within a corresponding key-way in the upper extremity of an auger 80. The tip of the drive shaft passes through a bore in the auger and is threaded to receive a nut or threaded knob 84 thereon. The auger is centrally bored as indicated at 85 so that it may be slipped freely over the drive shaft and sleeve 58 for rotation with respect to the sleeve, along with the drive shaft. Key 78 has sufficient area to support the auger on the drive shaft, and knob 84 maintains the auger on the shaft. A rubber O ring or gasket 90 received within a groove in the auger cooperates with the outer surface of central sleeve 58 to make bore 85 liquid tight.

Auger 80, illustrated in perspective in Figure 4, may be in the form of a large helix 86 formed from stainless steel or the like. Adjacent turns of the helix support a plurality of wipers or scrapers 88 at different levels. The wipers, more clearly illustrated in Figure 5, may include a longitudinal wiper blade 108 and a pair of flanges 110, slotted as indicated at 112. Slots 112, which receive the surfaces of the helix, as indicated in Figure 4, are sufficiently wide to allow substantially free movement of the wipers with respect to the auger. The wipers are received within slots 106 formed in the helical surfaces of the auger. These slots interlock with slots 112 and are sufficiently wide to allow substantial pivotal motion of the wipers. See Figure 3. The diameter of the auger is slightly less than the inner diameter of cylindrical walls 30 and 38 of the freezer chamber, and the wipers protrude beyond the auger sufficiently to contact the inner surface of the cylindrical walls. The wipers may be formed of a relatively soft material, such as nylon.

A curved partition 102 (Fig. 1) separates a front dispensing compartment 100 from motor compartment 76 in base 24. A spigot 94 located in the dispensing compartment communicates with an orifice in the bottom of the freezer chamber through an elbow 96 and a nipple 98. A pair of switches 104 may also be conveniently located in the dispensing compartment for controlling motor 74 and the compressor motor (not shown) of refrigerator 12. A thermostatic control (not shown) may be employed to control the compressor motor to maintain the temperature in the freezer chamber at any desired level.

In the operation of the invention cover 26 is removed, and liquid mix previously stored in refrigerator 12 is poured into reservoir 20. Cover 26 is then replaced to ensure sanitary conditions, and the mix is admitted to freezer chamber 22 as required by operating faucet 32. Refrigerant passing through coils 50 causes the liquid mix adjacent the cylindrical walls of the freezer chamber to begin to freeze. As auger 80 is rotated under the power of motor 74, scrapers 88 scrape the freezing mix from the freezing chamber walls and return it to liquid mix in the chamber, where it accelerates the freezing process. Auger 80 acts as an agitator and promotes the uniform freezing of the liquid mix. This process continues until the mix in the freezer chamber has been frozen to the desired degree. The frozen product may be withdrawn from the freezer chamber into a receptacle placed under the spigot 94. Opening the spigot allows the frozen product to flow under the influence of gravity aided by the action of the auger. The temperature of the freezer chamber is maintained so that the product is in the form of a soft custard which will flow through spigot 94 and which may be placed in a cone or drawn up from a receptacle through a straw. The thermostatic control may be employed to maintain the desired temperature and consistency.

The need for the addition of liquid mix to the freezer chamber may be easily determined by virtue of the transparency of the upper portion of the freezer chamber wall. When cleaning of the apparatus becomes necessary, the reservoir may be lifted from the freezer chamber, which in turn may be divided into two sections. The auger may be slipped from the central sleeve and the scrapers removed.

While a preferred embodiment of the invention has been shown and described, it will be clear to those skilled in the art that this embodiment is merely illustrative and that modifications may be made without departing from the principles of the invention, the scope of which is defined in the following claims.

I claim:

1. In a device of the character described, a substantially vertical freezer chamber having a lower tubular section and an upper tubular section, said sections being aligned and said upper section being supported on and separable from said lower section, covering means resting on said upper section, agitator means in said freezer chamber, refrigerating means surrounding the lower section of said freezing chamber, means for introducing a product to be frozen into said freezing chamber, and means for removing the frozen product from said chamber, said upper freezer chamber section being transparent, whereby said product may be readily observed to determine its viscosity and consistency.

2. In a device of the character described, a substantially vertical freezer chamber having a lower tubular section and an upper tubular section, said sections being aligned and said upper section being supported on and readily separable from said lower section, covering means resting on said upper section, a vertically mounted agitator in said freezer chamber, refrigerating means surrounding the lower section of said freezer chamber, means for introducing a product to be frozen in said freezer chamber, and means for removing the frozen product from said chamber, said covering means comprising a tubular reservoir for the product to be frozen, said reservoir being laterally coextensive with said upper freezer chamber section.

3. In the device of claim 2, said reservoir having a removable lid at its top, said means for introducing said product to be frozen comprising a valve at the bottom of said reservoir.

4. In a device of the character described, a substantially vertical freezer chamber having a lower tubular section and an upper tubular section, said sections being aligned and said upper section being supported on and readily separable from said lower section, covering means resting on said upper section, a vertically mounted agitator in said freezer chamber, refrigerating means surrounding the lower section of said freezer chamber, means for introducing a product to be frozen in said freezer chamber, and means for removing the frozen product from said chamber, said agitator comprising a single auger mounted only on an upstanding shaft in said freezer chamber and held on said shaft by a readily releasable locking means, said shaft being free at its upper end and said auger fitting over said free end.

5. In the device of claim 4, said agitator being helical and supporting means for wiping the inner surface of said freezer chamber, and means for rotating said agitator from below said freezer chamber.

6. A device for producing a frozen product from a liquid, comprising three tubular sections in vertical alignment, the lowest of said sections being closed at its bottom and open at its top for free communication with the intermediate section to form a freezer chamber, the highest section being closed at its bottom to form a liquid reservoir, refrigeration means surrounding said freezer chamber, a vertically mounted rotatable agitator in said freezer chamber, valve means for providing communication between said reservoir and said freezer chamber, and means for withdrawing the frozen product from said freezer chamber.

7. The device of claim 6, said intermediate section resting on but readily separable from said lowest section, said highest section having a lid, and said intermediate section being transparent.

(References on following page)

References Cited in the file of this patent

UNITED STATES PATENTS

| | | |
|---|---|---|
| 1,627,574 | Phillipi | May 10, 1927 |
| 1,874,718 | Tyson | Aug. 30, 1932 |
| 2,013,501 | Parker | Sept. 3, 1935 |
| 2,541,814 | Gaddini | Feb. 13, 1951 |
| 2,555,624 | Anderson | June 5, 1951 |
| 2,622,411 | Ogden | Dec. 23, 1952 |
| 2,629,229 | Hull | Feb. 24, 1953 |
| 2,645,911 | Martin | July 21, 1953 |
| 2,646,974 | Read | July 28, 1953 |
| 2,734,347 | Fischer | Feb. 14, 1956 |
| 2,775,877 | Bruntjen | Jan. 1, 1957 |

FOREIGN PATENTS

| | | |
|---|---|---|
| 319,179 | Italy | July 3, 1934 |
| 977,888 | France | Apr. 6, 1951 |